(12) United States Patent
Petronic et al.

(10) Patent No.: US 10,375,193 B2
(45) Date of Patent: Aug. 6, 2019

(54) SOURCE IP ADDRESS TRANSPARENCY SYSTEMS AND METHODS

(71) Applicant: Hughes Network Systems, LLC, Germantown, MD (US)

(72) Inventors: Mark Petronic, Gaithersburg, MD (US); Varun Santosh, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 428 days.

(21) Appl. No.: 14/555,355

(22) Filed: Nov. 26, 2014

(65) Prior Publication Data

US 2016/0150043 A1 May 26, 2016

(51) Int. Cl.
*H04L 29/08* (2006.01)
*H04L 12/46* (2006.01)
*H04L 29/12* (2006.01)

(52) U.S. Cl.
CPC ...... *H04L 67/2814* (2013.01); *H04L 12/4641* (2013.01); *H04L 61/2007* (2013.01); *H04L 61/2546* (2013.01); *H04L 61/6013* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,979,508 B1* | 7/2011 | Lamberton | ....... | H04L 29/08846 709/201 |
| 8,606,930 B1* | 12/2013 | Jain | ........................ | H04L 47/522 709/227 |
| 2002/0016926 A1* | 2/2002 | Nguyen | ............ | H04L 29/12018 726/12 |
| 2002/0042845 A1* | 4/2002 | Burmann | ................ | H04L 12/66 709/249 |
| 2002/0087221 A1* | 7/2002 | Keeler | ................. | G05B 13/027 700/48 |
| 2002/0087721 A1* | 7/2002 | Sato | .................. | H04L 29/12009 709/238 |

(Continued)

OTHER PUBLICATIONS

International Search Report and the Written Opinion for International App No. PCT/US2015/062532, dated Feb. 17, 2016, Authorized Officer: Finnie, Alistair.

*Primary Examiner* — Sargon N Nano
*Assistant Examiner* — Christopher B Robinson
(74) *Attorney, Agent, or Firm* — Sheppard, Mullin, Richter & Hampton LLP

(57) ABSTRACT

Systems and methods for source address transparency in a communication network include a proxy server and an IP gateway in which the proxy server receives a traffic flow from an end-user device and determines a source address for the detected traffic flow; the proxy server further creates a virtual interface corresponding to the end-user device from which the traffic flow was received and uses the virtual interface for that end-user device to exchange data between the end-user device and a designated web server. The virtual interface sends the traffic flow to the designated web server using the source address that is the same as or a variant of the source address for the end-user device from which the traffic flow was received.

28 Claims, 10 Drawing Sheets

(56) References Cited

U.S. PATENT DOCUMENTS

| | | | |
|---|---|---|---|
| 2005/0044242 A1* | 2/2005 | Stevens | H04L 65/105 709/228 |
| 2006/0031407 A1* | 2/2006 | Dispensa | H04L 29/12009 709/219 |
| 2006/0075123 A1* | 4/2006 | Burr | H04L 29/12311 709/228 |
| 2008/0225871 A1 | 9/2008 | Paskett et al. | |
| 2009/0024750 A1* | 1/2009 | Overby, Jr. | H04L 29/12509 709/229 |
| 2010/0037311 A1* | 2/2010 | He | H04L 63/0209 726/15 |
| 2010/0125742 A1* | 5/2010 | Ohtani | G06F 1/3209 713/310 |
| 2010/0128696 A1* | 5/2010 | Fantini | H04L 29/12028 370/331 |
| 2012/0042005 A1* | 2/2012 | Papakostas | H04L 29/12018 709/203 |
| 2012/0254464 A1* | 10/2012 | Armstrong | H04L 45/24 709/238 |
| 2013/0185455 A1* | 7/2013 | Nunberg | H04L 67/2823 709/238 |
| 2013/0238759 A1 | 9/2013 | Ostrowski | |

* cited by examiner

SOURCE IP ADDRESS TRANSPARENCY SYSTEMS AND METHODS

TECHNICAL FIELD

The present disclosure relates generally to broadband networks. More particularly, some embodiments of the present disclosure are directed toward systems and methods for implementing source address transparency for network communications.

BACKGROUND

Proxy servers are widely used by Internet Service Providers (ISPs) for performance improvement as well for enhanced security. A proxy server typically functions by intercepting layer-4 and/or application layer traffic to/from the end-user device and then performs specialized operations such as serving cached content, filtering malicious content, using the most optimal Quality of Service (QoS) based on the content type etc. While performing these functions, the proxy server acts on behalf of the end-user device and therefore the splits the traffic path into two segments: traffic between the end-user device and the Proxy server and the traffic between Proxy server and the origin server.

FIG. 1 illustrates a simplified example of the use of Proxy server in a network. In the illustrated example, proxy server 134 can be implemented as a computing system or an application that can be configured to act as an intermediary between the end-user device 132 and a web server (e.g., an origin server 138), which can be accessed via the Internet 136. Proxy servers such as proxy server 134 typically intermediate to handle requests for services or resources from one or more end-user devices 132. In operation, the end-user device 132 connects to the proxy server and requests service from another server such as, for example, origin server 138. The service can include, for example, a file, a connection, a webpage, or other resource available from origin server 138. The proxy server receives the request and communicates with origin server 138 as a proxy for the end-user. Although one end-user device 132 and one origin server 138 are illustrated, proxy servers 134 can typically handle traffic among multiple end-user devices 132 and origin servers 138.

The traffic between proxy server 134 and origin server 112, 114, as seen by origin server 138 or any intermediate devices, originates and terminates on proxy server 134. The source IP address of originating traffic 112 is that of proxy server 134 and not that of the end-user device on whose behalf the proxy server is requesting the content. One of the core functions of proxy server 134 is the identification and tracking of individual traffic flows. The start or end of a traffic flow is dependent on the type of layer-4 and/or application protocol but usually has very well defined interactions.

As an example, in the case of TCP layer-4 protocol, the 3-way handshake is a well-defined indicator for start of a traffic flow and at any point in time, the TCP 5-tuple (Source Address, Source Port, Destination Address, Destination Port and Protocol) uniquely identifies a traffic flow. TCP half close interactions can be used as an indicator for end of the traffic flow. In the case of HTTP application layer protocol, a HTTP transaction/flow starts with the receipt HTTP request message (e.g. GET, POST, PUT, HEAD etc.). The proxy server tracks the HTTP flow by matching the requests and the corresponding responses (200 OK, 302 Found, 404 Not Found etc.). The receipt of a complete response (which can span multiple TCP segments) marks the end of the HTTP transaction/flow. At any instant proxy server 134 has complete state information on all flows between end-user device 132 and itself as well as the corresponding traffic flows between itself and origin server 138.

The presence of the proxy server's IP address in the traffic 114 can prevent the use of applications such as legal interception, traffic shaping or geolocation, which rely on the source IP address to perform their functions. To enable the use of such specialized functions, the source IP address of the traffic from the proxy server is ideally that of the end-user device. The use of end-user device's 132 IP address as the source address in traffic originating from proxy server is referred to as Source IP Address Transparency. One conventional solution for achieving Source IP address transparency is the use of specialized device/application to perform layer-4 switching.

FIG. 2 illustrates an example of the use of Layer-4 switching device/application for implementing Source IP address transparency. As seen in FIG. 2, this example includes a layer 4 switch, or application, 140 providing an interface for proxy server 134. The layer-4 switching device/application 140 in various implementations is capable of identifying traffic flows. Using configuration and run time control information, the layer-4 switch/application 140 can be configured to alter the IP and layer-4 (e.g. TCP) header contents. This capability of the layer-4 switch/application 140 may be used to insert the IP address of end-user device 132 in the IP packets carrying the layer-4 segments. Accordingly, in the example of FIG. 2, at signal paths 164 and 165, the source IP address is that of end-user device 132; at signal path 166 the source IP address is that of proxy server 134; and at paths 168, the source IP address is that of end-user device 132. Also illustrated is control signaling 162 to allow the proxy server to control layer-4 switch 140.

Commercial off the shelf layer-4 switching devices are available for inspecting layer-4 traffic flows and then performing variety of functions including switching of source IP addresses. The use of a separate device may provide fast time-to-market advantage but it can have the disadvantage of increased equipment cost. There are also system redundancy issues that need to be considered when using a standalone layer-4 switching device. Implementing layer-4 switching function as standalone software application within the proxy server is a possible alternative to the use of separate device. However, implementation of layer-4 switching has its own development costs, processing complexity, scaling issues as well as software maintenance costs.

SUMMARY

Systems and methods are provided in various embodiments for providing source IP address transparency for network communications conducted using a proxy server. Particularly, various embodiments of the systems and methods disclosed herein can be configured to create and utilize a virtual interface for source IP address transparency communications. The virtual interface may be configured to allow the proxy server to utilize the IP address of end-user devices, or a variation thereof, as the IP address for communications from the proxy server when communicating with network elements or servers such as, for example, origin servers or other web servers. In various embodiments, the virtual interface can be configured to include a virtual IP address tied to the loopback interface of the proxy server.

In various embodiments, when the proxy server detects the start of the traffic flow, (e.g, when the proxy server receives a request from the end user device), the proxy server creates a virtual IP address for that device. This is referred to herein as a virtual interface. The virtual IP address may be set to a variant of the source IP address of the end-user device (i.e., the source address of the TCP connection). For example, the virtual IP address of an end-user device can be the end-user-device IP address +1. In other embodiments, the virtual IP address is some other variant of the end-user-device IP address. Preferably, however, the virtual IP address is chosen as being in the same subnet as the IP address of the end-user device. With the virtual interface established for the device, the proxy server uses that virtual interface to exchange data on behalf of the corresponding end-user device. For example the proxy server uses defined routing tables (which may be multicast from an IP Gateway, for example) to route communications to the web server using the virtual IP address as the source address.

Typically the creation and assignment of virtual IP addresses can be carried out using a single API call or CLI command. Because in some applications the end-user client may use different types of addresses (e.g., IPv4 and/or IPv6 addresses), the proxy server may create two virtual IP addresses (e.g., one for IPv4 and another for IPv6).

In one embodiment, a method for source address transparency in a communication includes a proxy server receiving a traffic flow from an end-user device and determining a source address for the detected traffic flow; the proxy server determining a virtual IP address corresponding to a source IP address of the end-user device from which the traffic flow was received and using the virtual IP address to exchange data between the end-user device and a designated web server; and the virtual interface sending the traffic flow to the designated web server using the virtual address as its source address. The virtual address may be the same as or a variant of the source address for the end-user device from which the traffic flow was received. In return, the proxy server receives a response to the traffic flow from the designated web server and routes the response to the end-user device In some embodiments, the proxy server receiving a traffic flow from an end-user device comprises receiving the traffic flow by way of an IP gateway, and the IP gateway determines whether the traffic flow should be handled using source address transparency. Determining whether the traffic flow should be handled using source address transparency can be accomplished by determining a destination port for the traffic flow designated by the end-user device and making the determination based on the destination port designated by the end-user device. In various embodiments, a range of destination ports can be used to identify a source IP address transparent connection. The IP gateway can be further configured to create an IP address mapping between the end user device and the proxy server.

The process can further be configured such that the proxy server receives the response to the traffic flow from the designated web server directly or by way of the IP gateway. Accordingly, the IP gateway can receive the response and determine whether the response should be routed to the proxy server or whether the response should bypass the proxy server. The IP gateway can be configured to store information indicating whether the traffic flow should be handled using source address transparency, and the IP gateway determining whether the response should be routed to the proxy server can include checking the stored information to determine whether the traffic flow corresponding to the response was handled using source address transparency In further embodiments, a network system implementing source address transparency for communications between an end-user device and a server, can include a proxy server, having a plurality of virtual interfaces. The proxy server can be configured to perform the operations including: receive a traffic flow from an end-user device and determine a source address for the detected traffic flow; create a virtual interface corresponding to the end-user device from which the traffic flow was received; and send via the virtual interface the traffic flow to the designated web server using a source address that is the same as or a variant of the source address for the end-user device from which the traffic flow was received.

The network system can include an IP gateway, wherein the IP gateway is configured to receive the traffic flow and determine whether the traffic flow should be handled using source address transparency. In various embodiments, determining whether the traffic flow should be handled using source address transparency can include determining a destination port for the traffic flow designated by the end-user device and making the determination based on the destination port designated by the end-user device. The IP gateway may also be configured to create an IP address mapping between the end user device and the proxy server.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide mechanisms for providing source IP address transparency for network communications conducted using a proxy server. Particularly, various embodiments of the systems and methods disclosed herein can be configured to create and utilize a virtual interface, which can be configured to allow the proxy server to utilize the IP address of end-user devices (or a variant thereof) as the source IP address when communicating with network elements or servers such as, for example, origin servers or other web servers. In various embodiments, the proxy server can be configured to use the virtual interface to route communications to the web server using the virtual IP address as the source address.

In various embodiments, when the proxy server detects the start of the traffic flow, it checks the source IP address used by the detected traffic flow and creates a virtual interface for the end-user device from which the flow is detected. For example, in some applications, the traffic may flow to the proxy server on a virtual LAN (VLAN), and the proxy server obtains information from the end-user device to create the virtual IP address. Traffic can then be sourced from that virtual IP address and the proxy server routes the flow on the VLAN it came in on.

As noted, in various embodiments, the virtual interface includes one or more virtual IP addresses tied to the loopback interface of the proxy server. The virtual IP address may be a variant of the source IP address of the corresponding end-user device. For example, the virtual IP address can be the end-user-device IP address, incremented or decremented by an integer value (e.g., source IP address +1). Preferably, the virtual IP address, although a variant of the source IP address is in the same subnet as the source IP address.

The IP address of the new virtual interface is set to the virtual IP address associated with the corresponding end-user device. In various embodiments, the virtual interfaces are created as communications occur with new end-user devices, and can be terminated when those flows are terminated.

Figure 1:
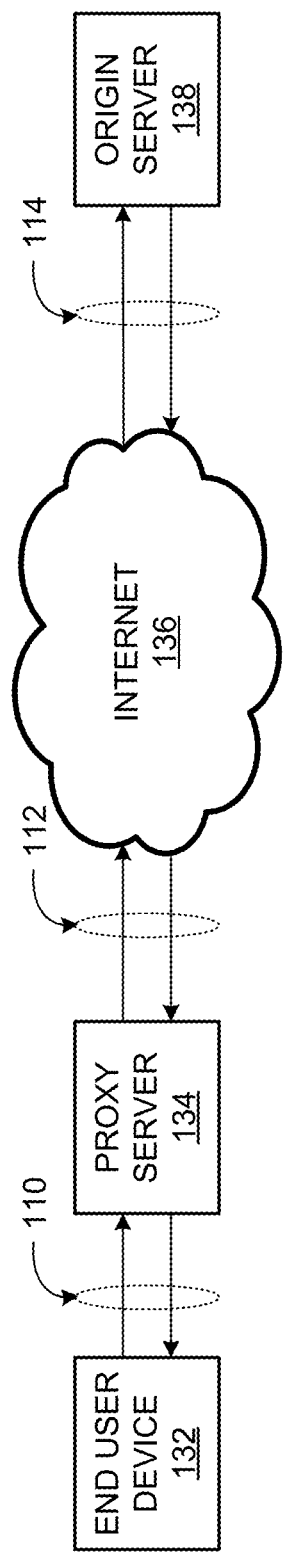
FIG. 1 illustrates a simplified example of the use of Proxy server in a network.
Figure 2:
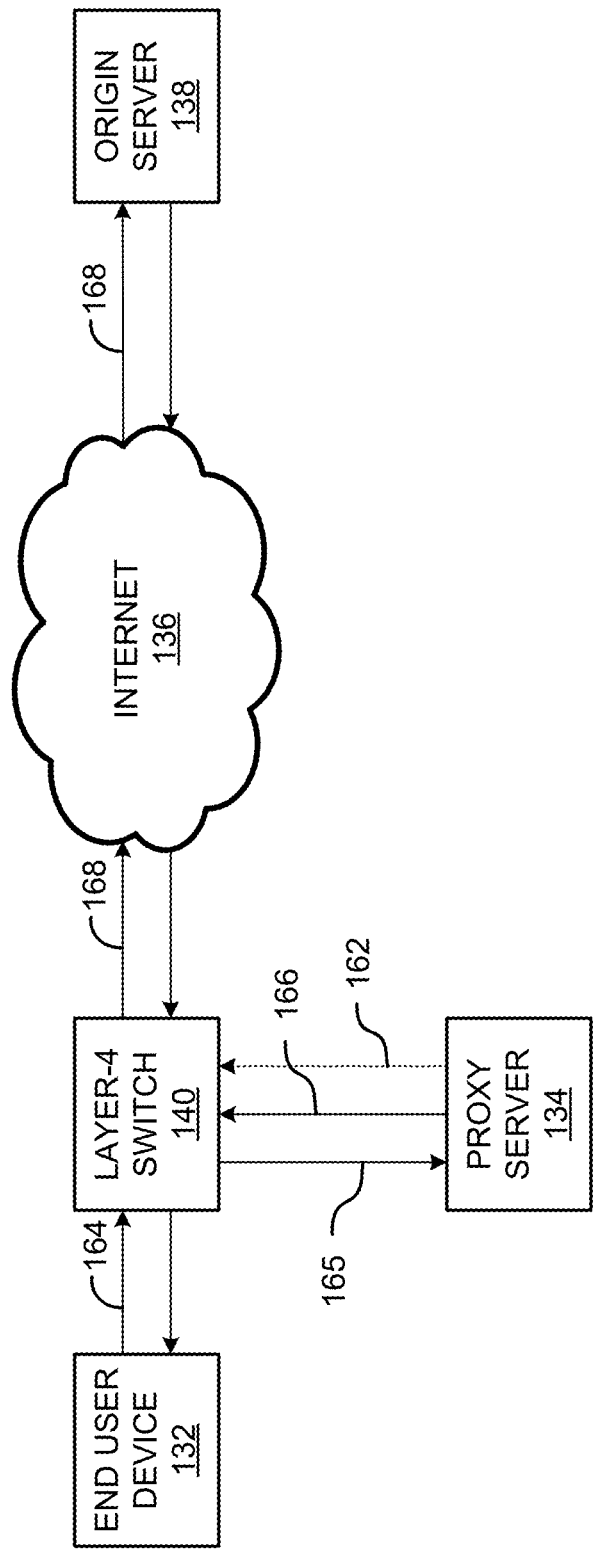
FIG. 2 illustrates an example of the use of Layer-4 switching device/application for implementing source IP address transparency in accordance with conventional teachings.
Figure 3:
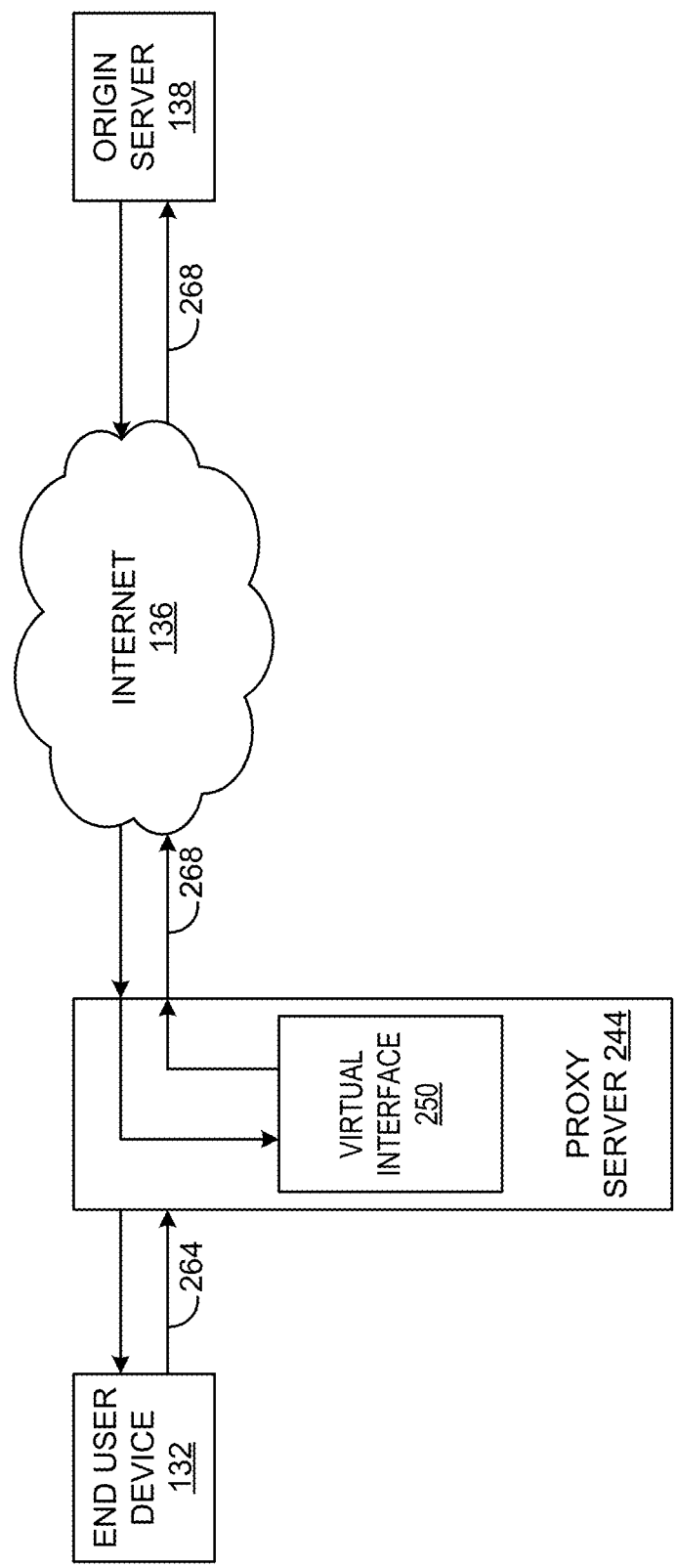
FIG. 3 is a diagram illustrating an example of a virtual interface included with a proxy server in accordance with one embodiment of the systems and methods disclosed herein.

FIG. 3 is a diagram illustrating an example of a virtual interface included with a proxy server in accordance with one embodiment of the systems and methods disclosed herein. Referring now to FIG. 3 in this example a proxy server 244 is provided with a virtual interface 250. Virtual interface 250 in various embodiments can actually include multiple virtual interfaces to provide a unique virtual interface corresponding to each of a plurality of end-user devices 132. In some embodiments, the virtual interface includes a virtual IP address associated with the end-user terminals (e.g., end-user devices 132 on FIG. 2) and web servers (e.g. origin servers 138 on FIG. 2).

Rather than terminating virtual interfaces when flows are terminated, in some embodiments virtual interfaces can be maintained and reused as new flows from corresponding end-user devices are initiated. Accordingly, in various embodiments, when proxy server 244 creates a virtual interface for an end-user device 132, it stores an indicator in memory for of the virtual interface so the virtual interface can be recalled for later use. For example, it can be configured to create a virtual interface memory entry (e.g., a table entry) for the virtual interface that is indexed or keyed (or otherwise searchable) using the IP address of the end-user device 132. As subsequent communications are received from end-user devices 132, their associated IP addresses can be checked against the virtual interface table entries to determine whether a virtual interface has already been created for the end-user device.

In operation, the virtual interface created for the device can be configured to communicate with the web server (e.g. origin server 138) using the created virtual IP address associated with the corresponding terminal (e.g. End-user device 132) as the source address for the communication. Accordingly, any actions taken or responses made by the designated web server can take such actions and provide such responses using a virtual IP address based on the Source IP address of the requesting terminal. Therefore, communications from an end-user device 132 on communication paths 264 and 268 include the virtual IP address associated with that end-user device 132. In some embodiments, the source IP address for communications on paths 268 is that of the virtual interface, which is a variant of the end-user device 132. In other embodiments, the virtual IP address may be the same as the source IP address of the corresponding end-user device. As noted above, in some embodiments the virtual IP address is the end-user IP address +1 for the corresponding end-user device. This can be the case for both IPv4 and IPv6 IP addresses. Additionally, the network subnet may be configured for the end-user device such that the address +1 virtual address is guaranteed to be in the assigned subnet of the end-user device.

In various embodiments, layer 3 and four switching tables can be used to facilitate the described technology. Examples of this are disclosed in more detail below. The state information used for layer-4 switching is already available on the proxy server, since identifying traffic flows and acting on them is a core function of the proxy server. Various embodiments use the state information and add functionality to support Source IP address transparency. For example, a virtual interface may be implemented as a logical representation of a network interface that may or may not be associated with a physical network interface/adapter. The virtual interface can be implemented such that it may be handled by the operating system in the same way that the operating system handles a physical network interface. Because many contemporary operating systems support API or command line interface for creating and deleting virtual interfaces, the virtual interface as disclosed herein can be created using these tools in various embodiments. To support source IP address transparency, the IP address of the end-user device is assigned to the virtual interface as described above. All data transfers on behalf of the end-user device that are intended to utilize the source IP address transparency, can use the virtual interface (created specifically for that end-user device in various embodiments). In operation, when the virtual interface communicates with the web server, the operating system's TCP/IP stack inserts the IP address assigned to the virtual interface as the source IP address for that communication.

Figure 4:
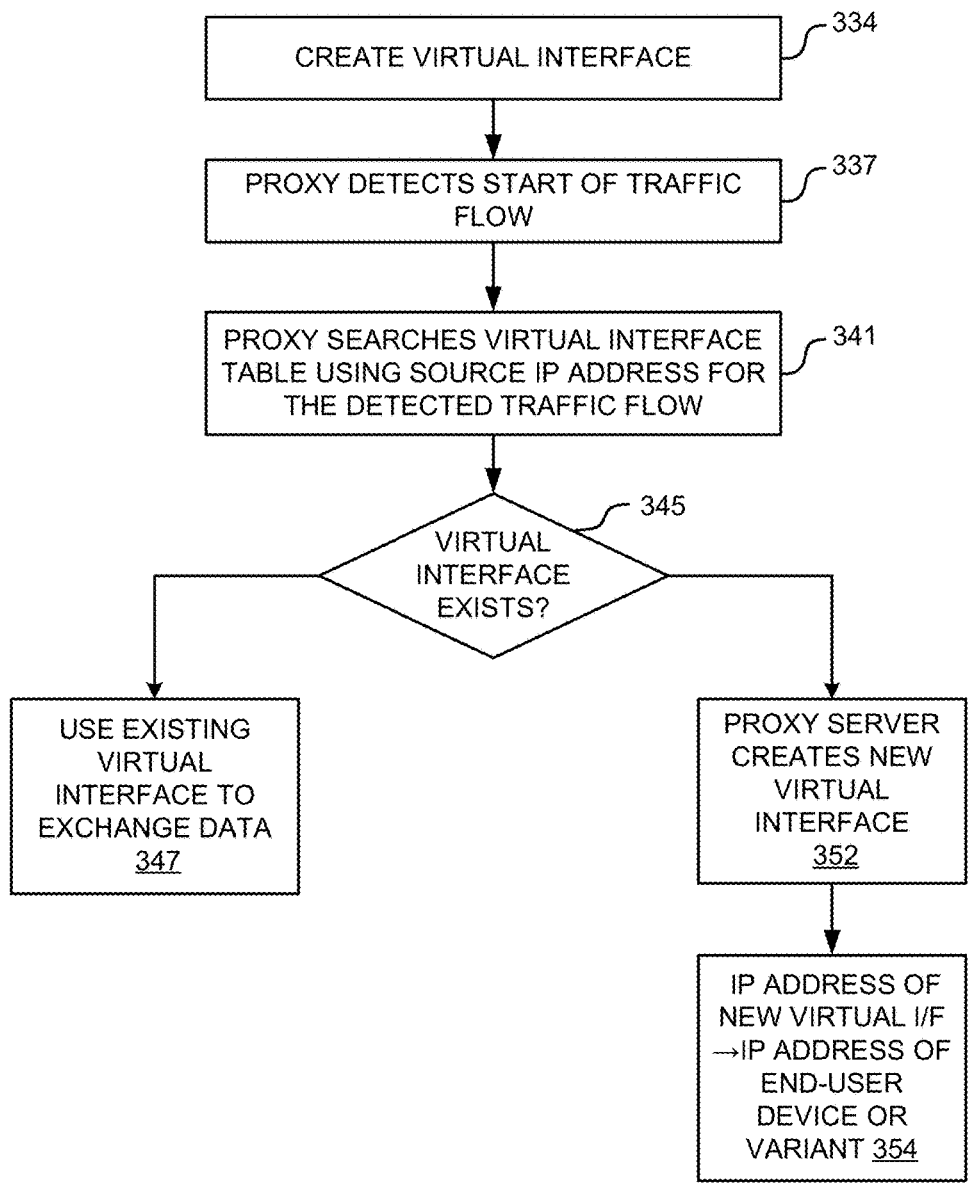
FIG. 4 is a diagram illustrating an example process for creating a virtual interface in accordance with one embodiment of the systems and methods disclosed herein.

FIG. 4 is a diagram illustrating an example process for creating a virtual interface in accordance with one embodiment of the systems and methods disclosed herein. Referring now to FIG. 4, in this example at operation 334, the proxy server creates a virtual interface. As noted above, in some embodiments, the virtual interface may include a virtual interface table that can be populated with entries corresponding to end-user devices communicating through the proxy server. At operation 337, the proxy server detects a traffic flow from an end-user device. When the traffic flow is detected, the proxy server determines the source IP address for the flow and searches the virtual interface table using that source IP address. This is illustrated at operation 341. If the source IP address is detected in the table, this indicates a virtual interface has already been created by the proxy server for that end-user device, and that the virtual interface exists.

If the virtual interface already exists, the proxy server uses that existing virtual interface to exchange data over the Internet. This is illustrated by operations 345 and 347. If, on the other hand, the virtual interface does not already exist for that end-user, the proxy server creates a new virtual interface and assigns the source IP address of the end-user device, or a variant thereof, as the IP address of the newly created virtual interface. This is illustrated by operations 345, 352 and 354. Having created the new virtual interface, the proxy server can communicate with the designated web server via the Internet using this virtual interface. The example illustrated in FIG. 4 assumes that virtual interfaces may be created and maintained after the termination of flows corresponding to those virtual interfaces. As noted herein, in other embodiments virtual interfaces are created as needed when flows are created, and terminated when their corresponding flows terminate.

Figure 5:
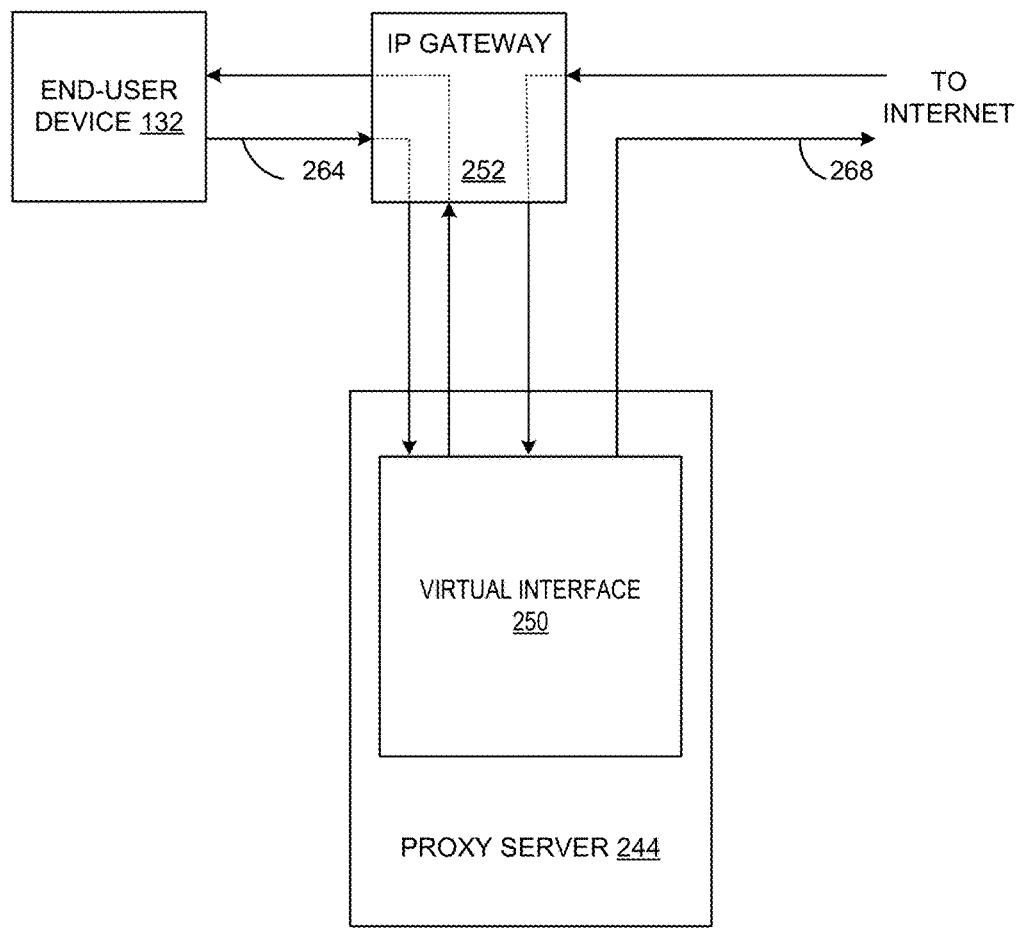
FIG. 5 is a diagram illustrating an example implementation including an IP gateway in accordance with one embodiment of the systems and methods disclosed herein.

In various embodiments, an IP gateway can be included to determine whether responses from the web servers should be returned directly to an end-user device, or whether they should be routed through the proxy server. FIG. 5 is a diagram illustrating an example implementation including an IP gateway in accordance with one embodiment of the systems and methods disclosed herein. Like the example of FIG. 3, the example illustrated in FIG. 5 includes a proxy server 244, which includes a virtual interface 250. As noted above, although one virtual interface 250 is shown, one of ordinary skill in the art after reading this description will understand that multiple virtual interfaces 250 can be created for proxy server 244.

In addition to proxy server 244, this example includes an IP gateway 252. Although IP gateway 252 is shown as being separate from proxy server 244, the functionality of IP gateway 252 can be integrated with or otherwise packaged with proxy server 244. In the illustrated example, all communications between the Internet and web servers and the end-user devices are routed through IP gateway 252 with the exception of communications 268 from the virtual interface to the Internet. In other embodiments, all communications between the Internet and web servers and the end-user devices are routed through IP gateway 252. IP gateway 252, in various embodiments, can be used to determine whether traffic should be routed through proxy server 244, or whether communications between the end-user device 132 and the Internet can be conducted without routing through proxy server 244. Examples of functionality that can be included within IP gateway 252 in various embodiments are described below.

In various embodiments, the proxy server invokes a Linux command line to add and remove virtual interfaces using Linux IP commands and subcommands. In some implementations, the end-user devices communicate IPV4 and IPV6 addresses when they connect to the proxy server. The proxy server, in turn, invokes shell command lines to Linux to add virtual interfaces for IPV4 and IPV6. Once created, the virtual interface can be configured as the front end to the proxy server. All outgoing requests are forwarded by the virtual interface using the virtual IP address. These requests may be routed using the kernel level routing tables of the proxy server, which, in some embodiments, are provided by the IP gateway. Accordingly, the proxy server opens a new connection out to the Internet, again, with the source IP address being a variant of the address of the original end-user device, because the connection is sourced from the virtual interface with the IP address of the end-user device. Because the virtual interfaces use the virtual IP address, the outgoing requests look like they are actually sourced by the original end-user devices. The response from the web server operates in a similar fashion in which the returning connection goes back to the proxy server, and particularly to the virtual interface associated with the virtual IP address. The virtual interface routes the response to the corresponding end-user device.

In some embodiments, once a virtual interface is created, all communications towards one or more origin servers initiated by the proxy server on behalf of an end-user device using source IP address transparency pass through the virtual interface corresponding to that end-user device. An API used for network communication (e.g. Berkeley/POSIX sockets) can be included to provide a mechanism to specify the interface/device to use for communication. As noted above, in various embodiments, the TCP/IP stack of the proxy server can be relied on to insert the virtual IP address assigned to the virtual interface as the source IP address. This ensures that all traffic originating from this virtual interface will have the corresponding IP address associated with its corresponding end-user device.

Timers or other like techniques can be used to measure idle time such that virtual interfaces can be removed or otherwise cleaned up when they are no longer needed or in use. In various embodiments, when the proxy server detects that end-user device is idle, the virtual interface is deleted. To keep track of idle time and active interfaces, the proxy server can be configured to update the virtual interface (e.g., a virtual interface table entry) with the time stamp of the most recent data transmission/reception. In other embodiments, timestamp information is not kept at the virtual interface but instead kept as part of the normal communication protocol between the end-user and the proxy server. That is, the virtual interface can be terminated when the connection between the end-user device and the proxy server expires. For example, in some embodiments, the end-user and the proxy server communicate using a specialized protocol such as, for example, the multiplexed block exchange (MBX) protocol, which uses TCP as its underlying transport mechanism. In such embodiments, the system can rely on idle time tracking maintained as part of MBX to determine when to terminate virtual interfaces. In other words, the virtual interfaces can be terminated or torn down when the MBX connection expires.

Virtual interfaces consume operating system resources (e.g. routing table entries), and the upper limit on the number of virtual interfaces that can be created is typically operating system dependent. Because the proxy server handles large number of end-user devices, the operating system resources are preferably used judiciously. Periodically, the Proxy server scans all the entries in the Virtual interface table. Virtual interfaces that are idle (determined using the current time and the time corresponding to the most recent access) for more than a configurable time period are deleted. Similar to the interface creation, virtual interface deletion is typically a single API call or CLI command, depending on the implementation. As noted above, in some embodiments this can be accomplished based on the idleness of the MBX connection.

As part of handling transactions from end-user devices, for large installations a large number interfaces will be created and deleted dynamically. For IP packets to be routed back to the correct virtual interface, the proxy server can be configured to employ standard routing protocols, such as, for example, the Border Gateway Protocol (BGP). When BGP is used, the configuration is preferably tuned to allow fast convergence of routes so that the packets from the origin server can be routed back to the Proxy server.

In some installations, the IP gateway and the proxy server can be configured in the same rack, or even in the same chassis. However, routing protocols used to route communications from the IP gateway to the proxy server (and vice versa) that are not aware of this proximity may route these communications through the top-of-rack switch, which is inefficient and adds latency. In various embodiments, the BGP protocol can be configured to use a direct hop between the IP gateway and the proxy server without having to go through the top-of-rack switch. This can be accomplished, for example, based on the device's MAC addresses.

Figure 6:
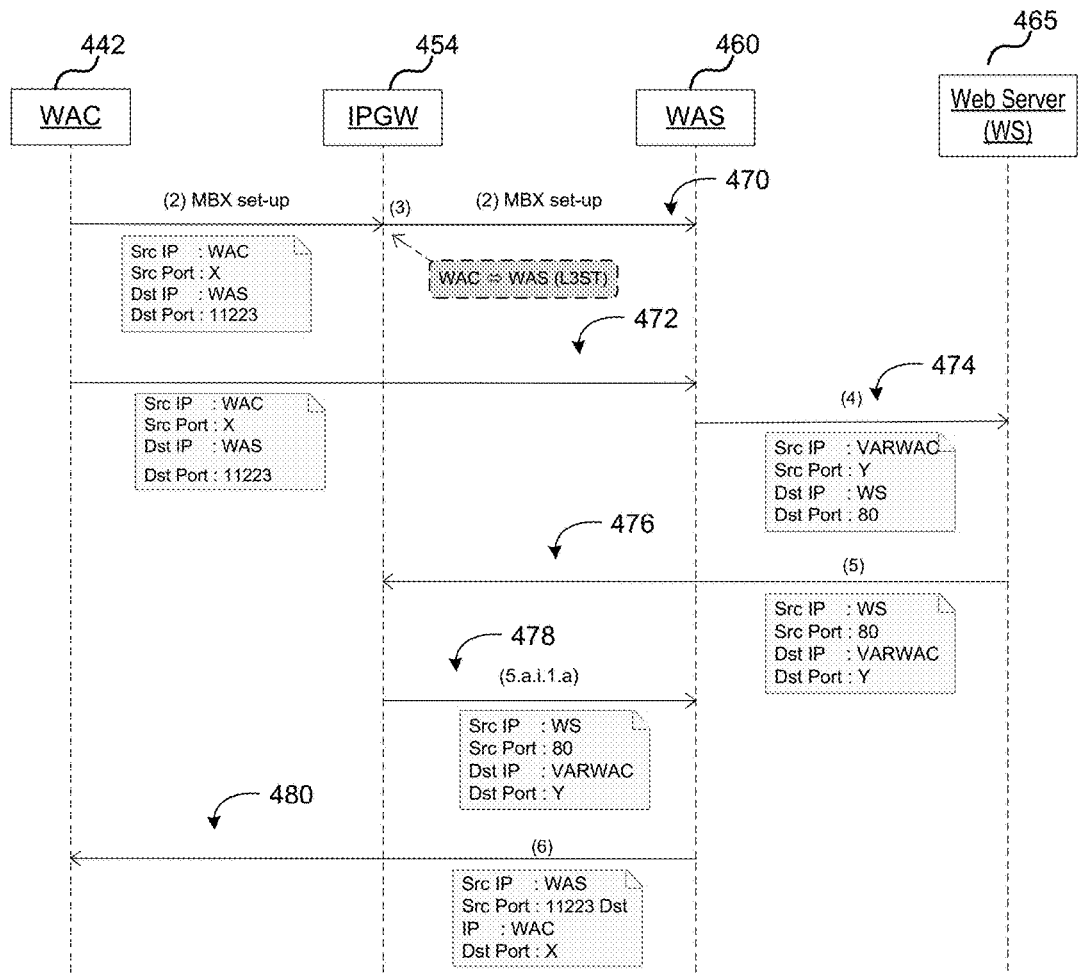
FIG. 6 is a ladder diagram illustrating an example communication through a proxy server using source IP address transparency in accordance with one embodiment of the technology described herein.

FIG. 6 is a ladder diagram illustrating an example communication through a proxy server using source IP address transparency in accordance with one embodiment of the technology described herein. This example is described in terms of a network including a Web Acceleration Server (WAS), a Web Acceleration Client (WAC) and the IP gateway (IPGW). The WAS 610 is a proxy server that implements HTTP acceleration functions. The IP gateway performs routing functions to route signals between the WAC and the WAS. In the example of a satellite network, the IP gateway can be configured as a specialized router that implements several satellite network specific routing and TCP acceleration functions. As noted above, the IP gateway can be part of the proxy server (WAS) or it can be a separate device. The WAC 442 is an end-user device and in some applications resides on the terminal (e.g., a very small aperture terminal (VSAT)) and interacts with the WAS 460 to implement HTTP acceleration functions. As noted above, in some embodiments, the WAC 442 and WAS 460 communicate using a specialized protocol referred to as the Multiplexed Block Exchange (MBX). The MBX protocol uses TCP as its underlying transport mechanism.

For continuity, and ease of understanding by the reader, the Web acceleration client is referred to as an end-user device 442, and the Web acceleration server is referred to as a proxy server 460. As seen in this example, the end-user device 442 sends an MBX set up message to the proxy server 460. This is illustrated by 470. The message flows through the IP gateway 454, at which time the IP gateway creates a table entry for the connection if the connection is identified as a source IP address transparent connection. In various embodiments, one or more specific destination ports, or range of destination ports, can be used to identify a source IP address transparent connection. In this embodiment, the destination port is a specially identified port (shown as 11223 in the illustrated example), which in this example is used by the end-user device 442 to select source IP address transparency. Accordingly, when the IP gateway 454 recognizes this destination port, the table entry is created corresponding to the end-user device 442. Likewise, the virtual interface is created at the proxy server 460 based on the identification of the destination port. In other embodiments, other mechanisms can be used to select source IP address transparency for the connection. These other mechanisms can include, for example, the setting of flags or other semaphores in the communication, or other signaling mechanisms or MAC layer techniques.

With source IP address transparency established, at operation 472, end-user device 442 sends a communication to proxy server 460. Note that in this example, this communication is sent using specially identified destination port (e.g., 11223). This communication also has a source IP address as the end-user device itself (designated as WAC in the illustrated example) with a source port designated as X. The destination port is the proxy server (designated as WAS in the illustrated example).

The proxy server 460 receives this communication and virtual interface sends this communication to the designated web server. This is illustrated at 474. As seen by the designations, the source IP address is a variant of the original source IP address of the sending device (VARWAC in this example). In other embodiments, the source IP address remains as the original source IP address as the sending device (WAC in this example). Also in this example, the source port has been changed to Y. To facilitate routing to the appropriate web server as identified by the sending end-user device 442, the proxy server (e.g. by the virtual interface) designates the destination IP address as WS and the destination port as 80.

Web server 465 receives the communication and provides the appropriate response. For example, the communication can be a request to download or retrieve information from the web server. Accordingly, the requested information is sent back to the requesting device. This is illustrated at 476. In this example, web server 465 understands that the requesting device has a source IP address of VARWAC (which is the virtual IP address of the virtual interface, and which in this embodiment is a variation of the original source IP address of the end-user device), and accordingly sends the response back to the destination IP address VARWAC at source port Y. Based on network protocol, this message is routed to the IP gateway 454.

The IP gateway 454 interrogates a response and determines that it was sent in response to a communication using source IP address transparency. It also determines the request was sent via the proxy server. This can be determined, for example, based on the table settings done during the setup 470. More detailed examples of this are described below. Based on these determinations, IP gateway 454 knows to not send the message directly to the original end-user device (WAC), but instead provides the response to the proxy server as indicated at 478. The proxy server changes the source IP address of the message to the proxy server IP address (WAS in this example), changes the source port to a port identifying source IP address transparency (112233 in this example), and sends a message to the designated original end-user (WAC) at its original source IP address (WAC) at destination port X.

Figure 7:
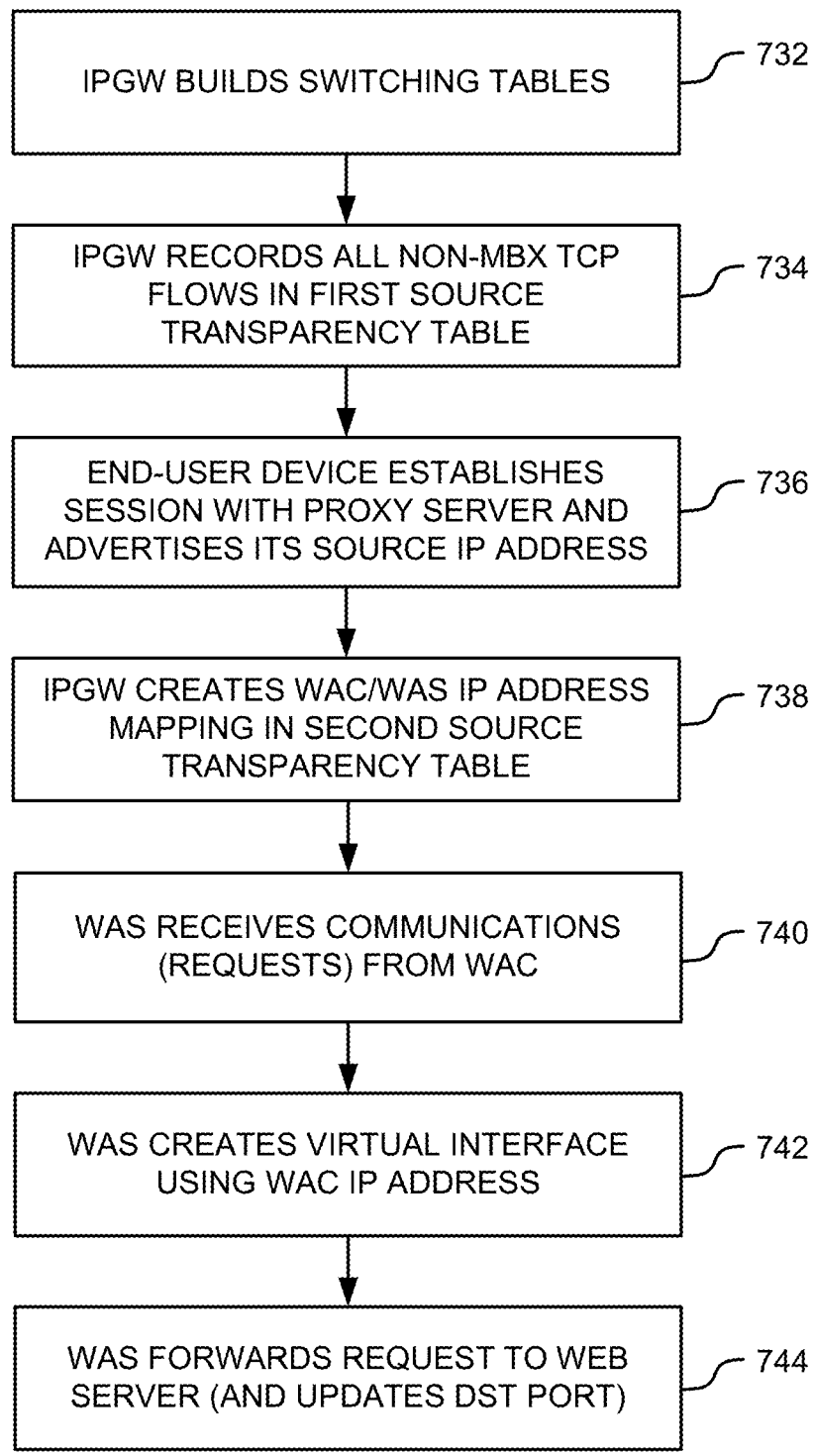
FIG. 7 is an operational flow diagram illustrating an example process for sending a communication from an end-user to a web server in accordance with one embodiment of the systems and methods described herein.

FIG. 7 is an operational flow diagram illustrating an example process for sending a communication from an end-user to a web server in accordance with one embodiment of the systems and methods described herein. For clarity, this example may be described from time to time in terms of the example ladder diagram illustrated in FIG. 6.

At operation 732, the IP gateway constructs the switching tables. In some embodiments, the IP gateway can construct to switching tables for traffic switching. In some embodiments, the IPGW is configured to maintain two separate tables for traffic switching. One table can be used to identify TCP sessions between end-user device and the proxy server, and another table can be used to identify and record the initiation and termination of sessions between the end-user device and the proxy server. As a further example, in one embodiment the IP gateway is configured to build a Layer 4 Switching Table (L4ST) by identifying and recording the initiation and termination of TCP sessions between a terminal and a web server on a designated port. The IP gateway can be configured to handle communications that bypass the proxy server as well as communications that are directed through the proxy server.

For communications that bypass the proxy server (designated in some embodiments by the designated destination ports), the IP gateway uses the L4ST to switch the traffic returning from the web server directly to the requesting end-user device, bypassing the proxy server. For all other destination ports, including ports that use source IP address transparency, the IP gateway routes traffic to the proxy server. Accordingly, the IP gateway can track sessions that bypass the proxy server in the L4ST table. In the example illustrated in FIG. 7, this is shown at operation 734 in which the IP gateway records all non-MBX TCP flows in the first source transparency table. Handling of communications that use source IP address transparency ports can be referred to, for shorthand, as STTS, or source transparency traffic switching, in some applications.

In the illustrated example, the IP gateway also builds a Layer 3 Switching Table (L3ST) by identifying and recording the initiation and termination of sessions (e.g., MBX sessions in the above example) between an end-user device and a proxy server. Any TCP packet destined to the terminal that does not initiate a new TCP session and also does not match an existing session in the L4ST table (i.e., is not designated as bypassing the proxy server) is forwarded to the appropriate proxy server by the IP gateway based on the L3ST table.

At operation 736, the end-user device initiates a session (e.g., an MBX session) with the proxy server and advertises its IP address. At operation 738, the IP gateway creates an IP address mapping between the end-user device and the proxy server. In some embodiments, this can be done by the proxy server in a source transparency table. This identifies the session establishment (e.g., MBX session establishment) between the end-user device and the proxy server. In some embodiments, the source transparency table can be referred to, for example, as a layer 3 source transparency (L3ST) table.

At operation 740, the end-user device sends requests (communications) to the proxy server. In response, the proxy server creates a virtual interface using the IP address of the requesting end-user device (or a variant thereof), and uses that virtual interface to forward those requests to the designated web server. This is illustrated at operations 742 and 744. This can be done, for example, directly to a network address translation (NAT) router on the appropriate virtual local area network (VLAN) (which can be the same as the one on which the HTTP request came in).

Figure 8:
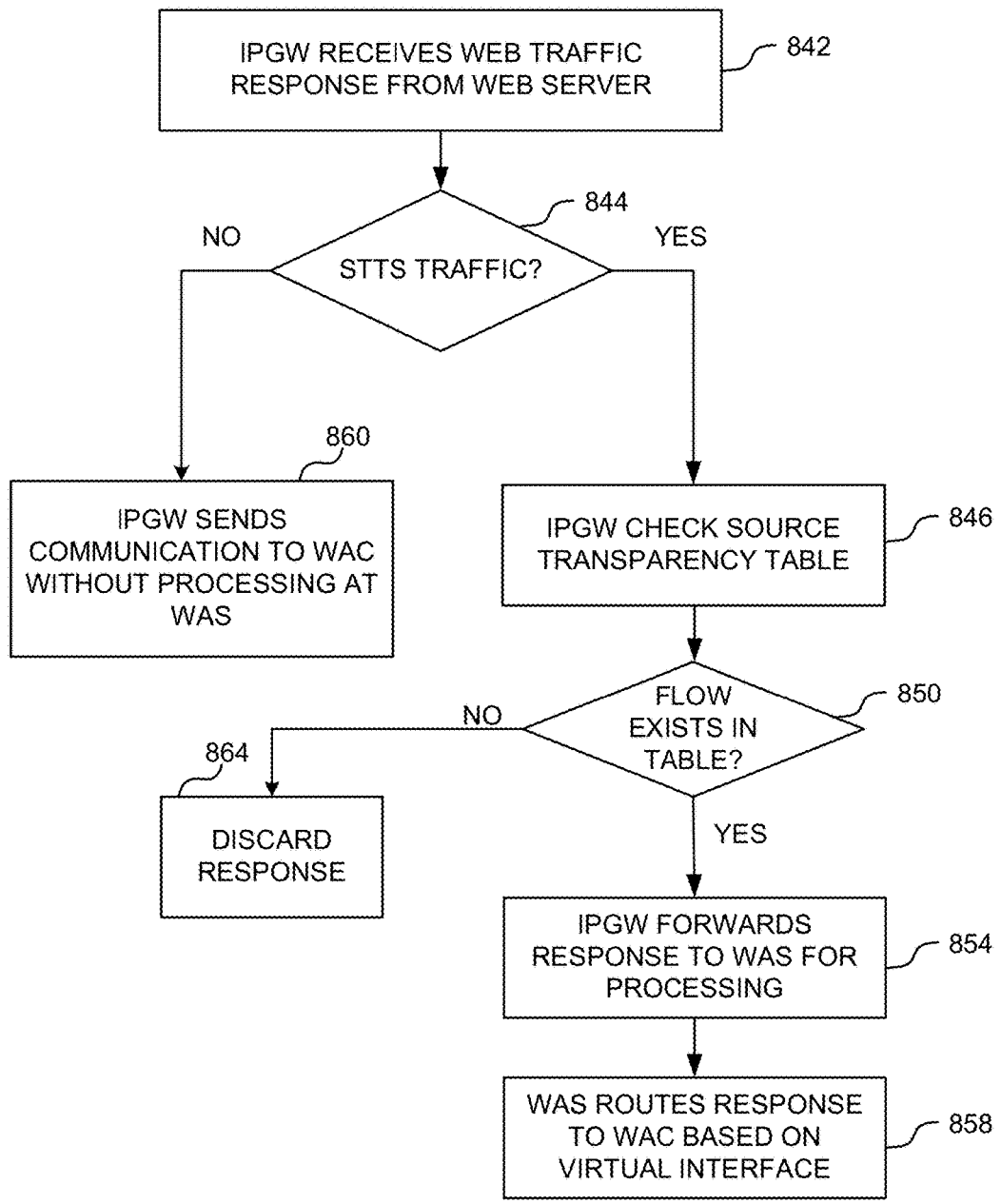
FIG. 8 is a diagram illustrating one example for routing a response to a request sent using source IP address transparency in accordance with one embodiment of the systems and methods described herein.

Having thus described an example for communicating requests or messages using source transparency between end-user device in a web server, an example process for communicating the response is now described. Particularly, FIG. 8 is a diagram illustrating one example for routing a response to a request sent using source IP address transparency in accordance with one embodiment of the systems and methods described herein. Referring now to FIG. 8, at operation 842, the IP gateway receives Web traffic from the web server in response to a request sent by an end-user device. At operation 844, the IP gateway determines whether the communication is in response to a request was sent by the proxy server. This can be determined, for example, by checking the L4ST table to see if the communication is listed in the table. If not, at operation 860 the IP gateway sends the packet to the end-user device without processing by the proxy server.

If, on the other hand, the communication is in response to a request that was routed through the proxy server, the IP gateway routes the response to the proxy server. As part of this routing, the IP gateway can check the source transparency table to ensure that the communication is listed in the table. This can be done by checking the destination IP address for the communication to see if it is listed in the table (or otherwise checks to see if the virtual interface exists for this flow). This is illustrated by operations 846 and 850. If the IP address for the communication is in the table, the IP gateway can route the communication to the proxy server for handling via the virtual interface. This is illustrated at operation 854. If for some reason the communication is not listed in the table, the Gateway can discard the communication as shown at operation 864. The proxy server then routes the response to the intended end-user device using the virtual interface. This is illustrated at operation 858.

Figure 9:
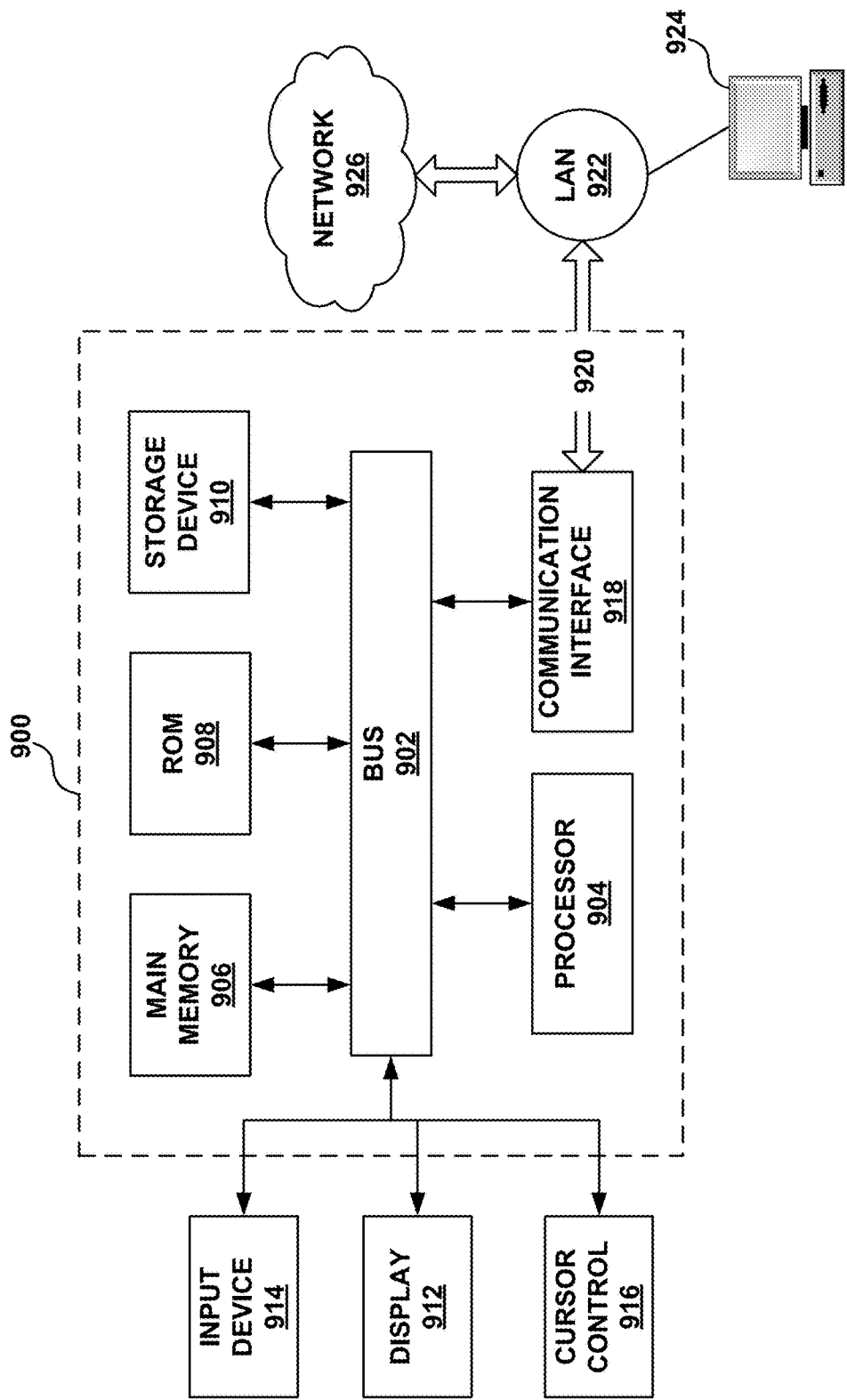
FIG. 9 illustrates a computer system upon which example embodiments according to the systems and methods disclosed herein can be implemented.

FIG. 9 illustrates a computer system 900 upon which example embodiments according to the present invention can be implemented. Computer system 900 can include a bus 902 or other communication mechanism for communicating information, and a processor 904 coupled to bus 902 for processing information. Computer system 900 may also include main memory 906, such as a random access memory (RAM) or other dynamic storage device, coupled to bus 902 for storing information and instructions to be executed by processor 904. Main memory 906 can also be used for storing temporary variables or other intermediate information during execution of instructions to be executed by processor 904. Computer system 900 may further include a read only memory (ROM) 908 or other static storage device coupled to bus 902 for storing static information and instructions for processor 904. A storage device 910, such as a magnetic disk or optical disk, may additionally be coupled to bus 902 for storing information and instructions.

Computer system 900 can be coupled via bus 902 to a display 912, such as a cathode ray tube (CRT), liquid crystal display (LCD), active matrix display, light emitting diode (LED)/organic LED (OLED) display, digital light processing (DLP) display, or plasma display, for displaying information to a computer user. An input device 914, such as a keyboard including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912.

According to various embodiments of the systems and methods disclosed herein, the functional modules described herein, such as, for example, proxy servers, IP gateways, end-user devices, web servers, and so on can be implemented using one or more computing systems to implement the functionality described herein as well as other functionality that may be performed by the various devices. Such functionality can be provided, in accordance with example embodiments, is by computer system 900 in response to processor 904 executing an arrangement of instructions contained in main memory 906. Such instructions can be read into main memory 906 from another computer-readable medium, such as storage device 910. Execution of the arrangement of instructions contained in main memory 906 causes processor 904 to perform one or more processes described herein. One or more processors in a multi-processing arrangement may also be employed to execute the instructions contained in main memory 906. In alternative embodiments, hard-wired circuitry is used in place of or in combination with software instructions to implement various embodiments. Thus, embodiments described in the present disclosure are not limited to any specific combination of hardware circuitry and software.

Computer system 900 may also include a communication interface 918 coupled to bus 902. Communication interface 918 can provide a two-way data communication coupling to a network link 920 connected to a local network 922. By way of example, communication interface 918 may be a digital subscriber line (DSL) card or modem, an integrated services digital network (ISDN) card, a cable modem, or a telephone modem to provide a data communication connection to a corresponding type of telephone line. As another example, communication interface 918 may be a local area network (LAN) card (e.g. for Ethernet™ or an Asynchronous Transfer Model (ATM) network) to provide a data communication connection to a compatible LAN. Wireless links can also be implemented. In any such implementation, communication interface 918 sends and receives electrical, electromagnetic, or optical signals that carry digital data streams representing various types of information. Further, communication interface 918 may include peripheral interface devices, such as a Universal Serial Bus (USB) interface, a PCMCIA (Personal Computer Memory Card International Association) interface, etc.

Network link 920 typically provides data communication through one or more networks to other data devices. By way of example, network link 920 can provide a connection through local network 922 to a host computer 924, which has connectivity to a network 926 (e.g. a wide area network (WAN) or the global packet data communication network now commonly referred to as the "Internet") or to data equipment operated by service provider. Local network 922 and network 926 may both use electrical, electromagnetic, or optical signals to convey information and instructions. The signals through the various networks and the signals on network link 920 and through communication interface 918, which communicate digital data with computer system 900, are example forms of carrier waves bearing the information and instructions.

Computer system 900 may send messages and receive data, including program code, through the network(s), network link 920, and communication interface 918. In the Internet example, a server (not shown) might transmit requested code belonging to an application program for implementing an embodiment of the present invention through network 926, local network 922 and communication interface 918. Processor 904 executes the transmitted code while being received and/or store the code in storage device 910, or other non-volatile storage for later execution. In this manner, computer system 900 obtains application code in the form of a carrier wave.

The term "computer-readable medium" as used herein refers to any medium that participates in providing instructions to processor 904 for execution. Such a medium may take many forms, including but not limited to non-volatile media, volatile media, and transmission media. Non-volatile media include, for example, optical or magnetic disks, such as storage device 910. Volatile media may include dynamic memory, such as main memory 906. Transmission media may include coaxial cables, copper wire and fiber optics, including the wires that comprise bus 902. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 10:
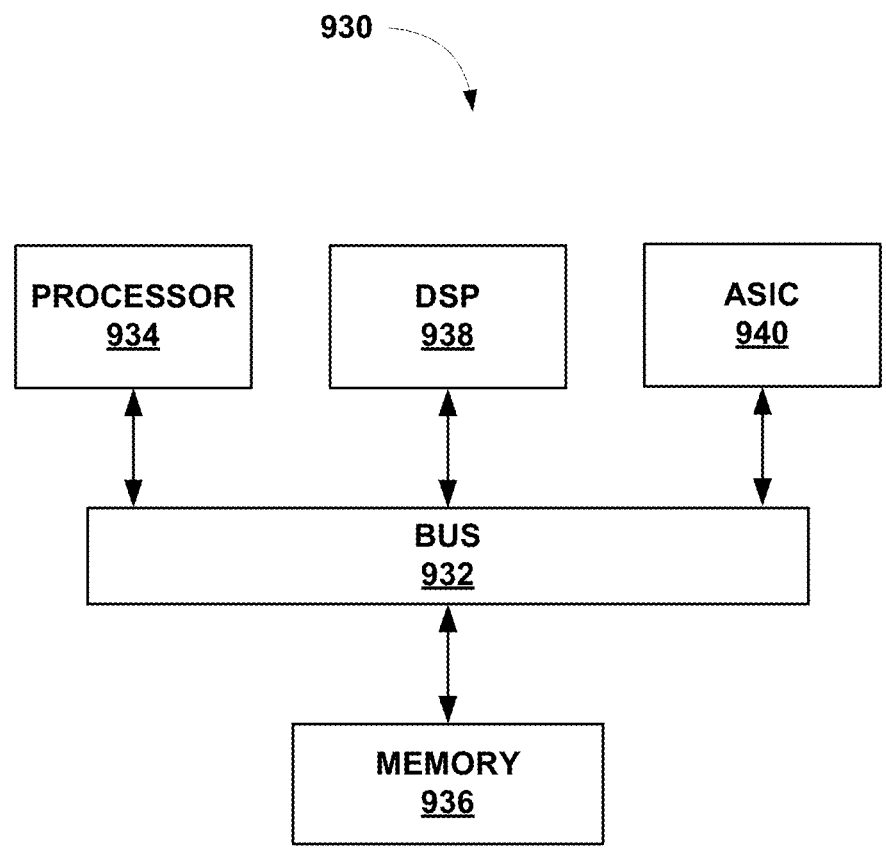
FIG. 10 illustrates a chip set in which embodiments of the systems and methods disclosed herein may be implemented.

FIG. 10 illustrates a chip set 930 in which embodiments of the invention may be implemented. Chip set 930 can include, for instance, processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 930 includes a communication mechanism such as a bus 932 for passing information among the components of the chip set 930. A processor 934 has connectivity to bus 932 to execute instructions and process information stored in a memory 936. Processor 934 includes one or more processing cores with each core configured to perform independently. A multi-core processor enables multiprocessing within a single physical package. Examples of a multi-core processor include two, four, eight, or greater numbers of processing cores. Alternatively or in addition, processor 934 includes one or more microprocessors configured in tandem via bus 932 to enable independent execution of instructions, pipelining, and multithreading. Processor 932 may also be accompanied with one or more specialized components to perform certain processing functions and tasks such as one or more digital signal processors (DSP) 938, and/or one or more application-specific integrated circuits (ASIC) 940. DSP 938 can typically be configured to process real-world signals (e.g., sound) in real time independently of processor 1004. Similarly, ASIC 940 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 994 and accompanying components have connectivity to the memory 936 via bus 932. Memory 936 includes both dynamic memory (e.g., RAM) and static memory (e.g., ROM) for storing executable instructions that, when executed by processor 994, DSP 938, and/or ASIC 940, perform the process of example embodiments as described herein. Memory 1006 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 300. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment.

Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for source IP address transparency in a communication network comprising a proxy server, comprising;

the proxy server receiving a traffic flow from an end-user device and determining a source IP address of the end-user device used by the detected traffic flow;

the proxy server creating a virtual interface corresponding to the end-user device from which the traffic flow was received and using the virtual interface for that end-user device to exchange data between the end-user device and a designated web server, wherein the virtual interface comprises a logical representation of a network interface, wherein the proxy server creating the virtual interface corresponding to the end-user device comprises the proxy server searching a virtual interface memory using the determined source IP address to determine whether a virtual interface exists for the end-user device, and if a virtual interface for the end-user device does not exist, the proxy server creating the virtual interface for the end-user device and using the created virtual interface to exchange data between the end-user device and the designated web server;

the proxy server assigning a source IP address to the created virtual interface that is the same as or in the same subnet as the source IP address for the end-user device;

the created virtual interface sending the traffic flow to the designated web server using the assigned source IP address.

2. The method of claim 1, wherein receiving a traffic flow from an end-user device comprises receiving the traffic flow at the proxy server on a virtual LAN (VLAN).

3. The method of claim 2, wherein sending the traffic flow to the designated web server comprising sourcing the traffic flow from the virtual interface and routing the flow on the VLAN.

4. The method of claim 1, wherein the source IP address of the virtual interface comprises a virtual address that is tied to a loopback interface of the proxy server.

5. The method of claim 1, further comprising the proxy server receiving a response to the traffic flow from the designated web server and routing the response to the end-user device.

6. The method of claim 5, further comprising the proxy server changing a source port identification in the response to a source port of the proxy server.

7. The method of claim 1, wherein the proxy server receiving a traffic flow from an end-user device comprises receiving the traffic flow by way of an IP gateway, and wherein the method further comprises the IP gateway receiving the traffic flow and determining whether the traffic flow should be handled using source IP address transparency.

8. The method of claim 7, wherein determining whether the traffic flow should be handled using source IP address transparency comprises determining a destination port for the traffic flow designated by the end-user device.

9. The method of claim 8, wherein a range of destination ports identify a source IP address transparent connection.

10. The method of claim 7, further comprising the IP gateway creating an IP address mapping between the end user device and the proxy server.

11. The method of claim 5, wherein the proxy server receiving a response to the traffic flow from the designated web server comprises receiving the response by way of an IP gateway, and wherein the method further comprises the IP gateway receiving the response and determining whether the response should be routed to the proxy server or whether the response should bypass the proxy server.

12. The method of claim 11, further comprising the IP gateway storing information indicating whether the traffic flow should be handled using source IP address transparency, and wherein the IP gateway determining whether the response should be routed to the proxy server comprises checking the stored information to determine whether the traffic flow corresponding to the response was handled using source IP address transparency.

13. The method of claim 11, further comprising the IP gateway maintaining an Layer 4 source transparency table and recording all flows that are not source ID transparent flows.

14. The method of claim 11, further comprising communicating in a direct hop between the IP gateway and the proxy server without routing the response through a top-of-rack switch.

15. The method of claim 1, wherein the virtual interface corresponding to the end-user device comprises a logical representation of a network interface having a source IP address that is the same as the source IP address of the corresponding end-user device.

16. The method of claim 1, further comprising the proxy server inserting the source IP address of the end user device as the source IP address for the virtual interface.

17. The method of claim 1, further comprising the proxy server measuring idle time of a connection with the end user device and removing a virtual interface corresponding to the end user device when the idle time meets or exceeds a predetermined threshold.

18. A network system implementing source IP address transparency for communications between an end-user device and a server, the system comprising:
  a computing device comprising a proxy server, the proxy server comprising a virtual interface table comprising a plurality of source IP addresses, each of the source IP addresses associated with a respective end-user device, the proxy server configured to perform the operations comprising:
    receive a traffic flow from an end-user device and determine a source IP address of the end-user device used by the detected traffic flow;
    create a virtual interface corresponding to the end-user device from which the traffic flow was received, wherein the virtual interface comprises a logical representation of a network interface;
    assign a source IP address to the created virtual interface that is the same as or in the same subnet as the source IP address for the end-user device;
    updating the virtual interface table with the assigned source IP address; and
    send via the created virtual interface the traffic flow to the designated web server using the assigned source IP address.

19. The network system of claim 18, wherein receiving a traffic flow from an end-user device comprises receiving the traffic flow at the proxy server on a virtual LAN (VLAN).

20. The network system of claim 19, wherein sending the traffic flow to the designated web server comprising sourcing the traffic flow from the virtual interface and routing the flow on the VLAN.

21. The network system of claim 18, wherein the source IP address of the virtual interface comprises a virtual address that is tied to a loopback interface of the proxy server.

22. The network system of claim 18, wherein the proxy server is further configured to determine whether a virtual interface corresponding to the end-user device exists, and if the virtual interface for the end-user device does not exist, create a new virtual interface for the end-user device.

23. The network system of claim 18, further comprising an IP gateway, wherein the IP gateway is configured to receive the traffic flow and determine whether the traffic flow should be handled using source IP address transparency.

24. The network system of claim 23, wherein determining whether the traffic flow should be handled using source IP address transparency comprises determining a destination port for the traffic flow designated by the end-user device.

25. The network system of claim 23, wherein the IP gateway is further configured to create an IP address mapping between the end user device and the proxy server.

26. The network system of claim 23, wherein the proxy server is further configured to receive a response to the traffic flow from the server by way of the IP gateway, and wherein the IP gateway is further configured to receive the response and determine whether the response should be routed to the proxy server or whether the response should bypass the proxy server.

27. The network system of claim 26, wherein the IP gateway is further configured to store information indicating whether the traffic flow should be handled using source IP address transparency, and wherein the IP gateway determining whether the response should be routed to the proxy server comprises checking the stored information to determine whether the traffic flow corresponding to the response was handled using source IP address transparency.

28. The network system of claim 26, wherein the IP gateway is further configured to maintain a Layer 4 source transparency table and recording all flows that are not source ID transparent flows.

* * * * *